US008856502B2

(12) United States Patent
Barrus et al.

(10) Patent No.: US 8,856,502 B2
(45) Date of Patent: Oct. 7, 2014

(54) PRE-INSTALLED APPLICATION ACTIVATION

(75) Inventors: Adam E. Barrus, Redmond, WA (US); Michael D. McCormack, Seattle, WA (US); Ramkumar Ramasubramanian, Bellevue, WA (US); Daniel W. DeKlotz, Redmond, WA (US); Rebecca Deutsch, Seattle, WA (US); Cary A. Polen, Bremerton, WA (US); Gaurav S. Anand, Seattle, WA (US); Kevin Michael Woley, Seattle, WA (US); Benjamin Salim Srour, Seattle, WA (US); Kyle T. Beck, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 13/398,092

(22) Filed: Feb. 16, 2012

(65) Prior Publication Data

US 2013/0219155 A1 Aug. 22, 2013

(51) Int. Cl.
G06F 15/177 (2006.01)
G06F 9/44 (2006.01)

(52) U.S. Cl.
CPC .................................. *G06F 9/4401* (2013.01)
USPC .............................................. 713/1; 713/323

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

| | | | |
|---|---|---|---|
| 6,260,150 B1 * | 7/2001 | Diepstraten et al. .......... | 713/323 |
| 7,904,901 B1 | 3/2011 | Tormasov et al. | |
| 2005/0055645 A1 * | 3/2005 | Matthews et al. ............. | 715/800 |
| 2008/0082603 A1 | 4/2008 | Mansour et al. | |
| 2008/0274716 A1 * | 11/2008 | Fok et al. ...................... | 455/410 |
| 2008/0313447 A1 * | 12/2008 | Gillett et al. ...................... | 713/1 |
| 2010/0251340 A1 | 9/2010 | Martin et al. | |
| 2011/0296401 A1 | 12/2011 | DePoy | |
| 2012/0185532 A1 * | 7/2012 | Kristiansson et al. ........ | 709/203 |

OTHER PUBLICATIONS

Warren, Tom., "Microsoft details its Windows 8 live tiles service", Retrieved at <<http://www.winrumors.com/microsoft-details-its-windows-8-live-tiles-service/>>, Retrieved Date: Feb. 1, 2012, pp. 9.

(Continued)

*Primary Examiner* — Kim Huynh
*Assistant Examiner* — Paul J Yen
(74) *Attorney, Agent, or Firm* — Sung Kim; Andrew Sanders; Micky Minhas

(57) ABSTRACT

Pre-installed application activation techniques are described in which live content for applications is activated before user interaction with the applications. Input indicative of an initial log-in of a user to access an operating system is detected. In response, configuration of an account for the user with the operating system may be initiated to set-up a device for first use by the user. During the configuration, notifications are activated through a notification system of the operating system to obtain live content for one or more pre-installed applications on the computing device. The activation occurs before interaction of the user with the pre-installed applications. Live content may then be incorporated with representations of the applications within a user interface for the operating system, such as displaying application tiles having corresponding live content in a start screen presented to the user after completion of the initial set-up.

20 Claims, 5 Drawing Sheets

(56) References Cited

OTHER PUBLICATIONS

Warren, Tom., "Windows 8 pre-beta Start Screen color customization screenshots leak", Retrieved at <<http://www.winrumors.com/windows-8-pre-beta-start-screen-color-customization-screenshots-leak/>>, Retrieved Date: Feb. 1, 2012, pp. 13.

"Windows Phone 7 confidential documentation leaked", Retrieved at <<http://www.rnachackpc.com/windows-phone-7-confidential-documentation-leaked/>>, Retrieved Date: Feb. 1, 2012, pp. 5.

* cited by examiner

PRE-INSTALLED APPLICATION ACTIVATION

BACKGROUND

The use of computing devices is ever increasing. For example, users may interact with traditional desktop computers, tablet or slate devices, mobile phones, and so on to access a variety of functionality for work and personal uses. Original equipment manufacturers (OEMs) often provide their devices with pre-installed applications. This may involve loading configuration files, installation packages and/or settings for pre-installed applications when configuring a device for a consumer. Pre-installed applications may be installed at the factory and/or be configured for installation during an initial set-up of the device and therefore may be ready for interaction by a user with the applications following the initial set-up.

Although pre-installing may prepare third-party applications for first use by a consumer, system features such as notifications, automatic updates, and live content for applications are traditionally not enabled/activated until a user explicitly selects the application, provides user settings/preferences, registers, and/or provides input to enable the application to interact with operating system interfaces, functionality, and services. In traditional scenarios, the initial set-up of the device may be controlled by an operating system in a manner that does not permit third-party code to operate. As such, pre-installed applications may provide limited or no functionality until a user chooses to interact with the applications. This deprives OEMs from being able to use system features to attract users to their pre-installed applications right away and may detract from the initial user experience with a device.

SUMMARY

Pre-installed application activation techniques are described in which live content for applications is activated before user interaction with the applications. Input indicative of an initial log-in of a user to access an operating system is detected. In response, configuration of an account for the user with the operating system may be initiated to set-up a device for first use by the user. During the configuration, notifications are activated through a notification system of the operating system to obtain live content for one or more pre-installed applications on the computing device. The activation occurs before interaction of the user with the pre-installed applications. Live content may then be incorporated with representations of the applications within a user interface for the operating system, such as displaying application tiles having corresponding live content in a start screen presented to the user after completion of the initial set-up.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is a flow diagram depicting a procedure in an example implementation in which live content for applications is activated during an initial user log-in.

DETAILED DESCRIPTION

Overview

Although pre-installing may prepare third-party applications for first use by a consumer, certain system features such as notifications, automatic updates, and live content for applications are traditionally not enabled/activated until a user explicitly interacts with the application. Accordingly, original equipment manufacturers (OEMs) are unable use such features to promote pre-installed apps on first use, which may detract from the initial user experience with a device.

Pre-installed application activation techniques are described in which live content and/or personalized content for applications is activated before user interaction with the applications. Input indicative of an initial log-in of a user to access an operating system is detected. In response, configuration of an account for the user with the operating system may be initiated to set-up a device for first use by the user. During the configuration, notifications are activated through a notification system of the operating system to obtain live content for one or more pre-installed applications on the computing device. The activation occurs before interaction of the user with the pre-installed applications. Live content may then be incorporated with representations of the applications within a user interface for the operating system, such as displaying application tiles having corresponding live content in a start screen presented to the user after completion of the initial set-up. Thus, the start screen may appear with live content right away which creates a powerful initial presentation of the device features to the user and allows OEMs to use live contact to attract users to pre-installed applications.

In the following discussion, an example environment and user interfaces are first described that may employ the techniques described herein. Example procedures are then described which may be performed in the example environment as well as other environments. Consequently, performance of the example procedures is not limited to the example environment and the example environment is not limited to performance of the example procedures. Lastly, an example system and components of the system are described that can be employed in one or more embodiments.

Example Environment

Figure 1:
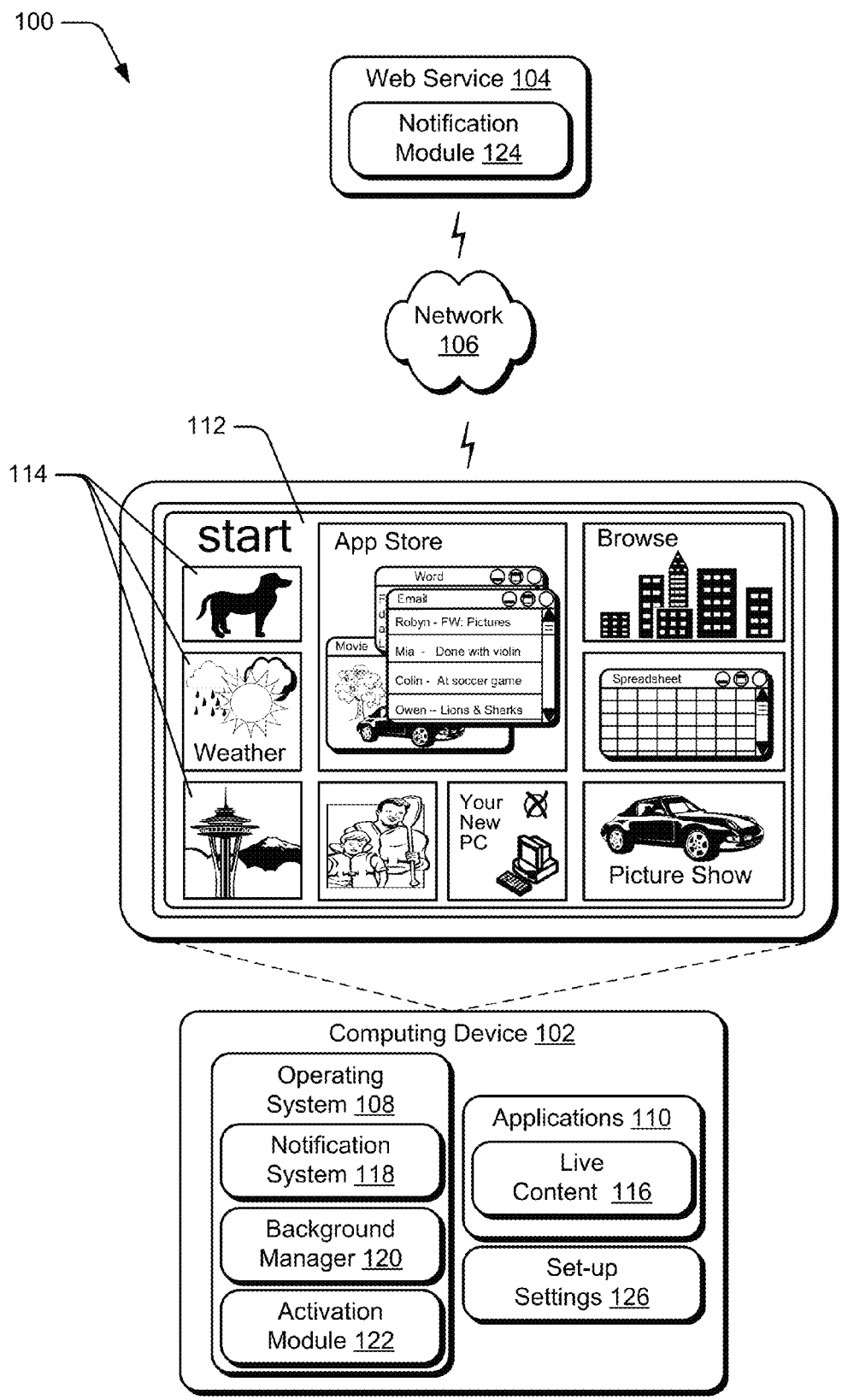
FIG. 1 is an illustration of an environment in an example implementation that is operable to employ pre-installed application activation techniques.

FIG. 1 is an illustration of an environment 100 in an example implementation that is operable to employ techniques described herein. The illustrated environment 100 includes a computing device 102 and a web service 104 that are communicatively coupled via a network 106. The computing device 102 and a web service 104 may be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone), a game console, and so forth. The computing device 102 may be configured as any suitable computing system and/or device that employ various processing systems, some additional examples of which are discussed in relation to the example system of FIG. 5.

The computing device 102 is further illustrated as including an operating system 108. Generally speaking, the operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device without understanding how this rendering will be performed. The operating system 108 may provide various services, interfaces, and functionality that applications 110 may invoke to take advantage of system features.

A variety of applications 110 to provide a wide range of functionality to the computing device 102 are contemplated including but not limited to a browser, an office productivity application, an email client, a multi-media management program, device management software, networking applications, to name a few examples. In accordance, with techniques described herein the applications 110 may also represent at least some applications that may be pre-installed on the device by OEMs. Such applications may take advantage of pre-installed application activation techniques described above and below.

The operating system 108 may also represent a variety of other functionality, such as to manage a file system and a user interface that is navigable by a user of the computing device 102. An example of this is illustrated as the user interface 112 configured as an application launcher or start screen (e.g., desktop) for the computing device 102 that is depicted in FIG. 1. The start screen includes representations of a various applications 110 that may be configured in various ways, such as by using icon, tiles 114 (as illustrated), textual descriptions, and so forth. The representations may also incorporate live content 116 that is associated with applications 110 when activated in accordance with techniques described herein. The start screen may include representations of selected items from a hierarchical file structure of the file system managed by the operating system 108. The representations or tiles 114 as shown in the illustrated example are selectable to launch a corresponding one of applications 110 for execution on the computing device 102. In this way, a user may readily navigate through a file structure and initiate execution of applications of interest.

The operating system 108 may provide services, interfaces, and functionality for different kinds of applications including "legacy" applications that may be written using statically compiled languages, such as C++, C# and "modern" applications that may be written using dynamic scripting languages, such as JavaScript. Modern applications operate through one or more runtime platforms supported by the operating system 108 that are configured to provide respective execution environments for corresponding applications. Runtime platforms provide a common set of features, routines, and functions for compatible applications thereby offloading coding of common tasks from application development. Thus, runtime platforms can facilitate portability of applications to different kinds of systems with little or no change to the dynamic script for the applications and/or without recompiling. Examples of runtime platforms include JAVA™ runtime environment (JRE), Adobe™ Flash™, Microsoft™ .NET framework, Microsoft Silverlight™, and WinRT™, to name a few examples.

The operating system 108 is further illustrated as including a notification system 118, a background manager 120, and an activation module 122, which may be employed to implement techniques for pre-installed application activation as well as other techniques. The notification system 118 is representative of functionality to manage notifications including notifications for alerts, messages, updates, and/or other live content 116 that may be displayed as part of the representations of the applications. The notification system 118 may operate to obtain various notifications on behalf of applications 110 that register with the notification system. Accordingly, the notifications may be handled by the notification system 118 without executing the corresponding applications 110. For example, the notification system 118 may receive the live content 116 and/or other notifications from a variety of different sources, such as from software (e.g., other applications executed by the computing device 102), from a web service 104 via the network 106, and so on. For instance, the web service 104 may include a notification module 124 with which the notification system 118 interacts to obtain notifications using a push model, a pull model, or other suitable techniques suitable for obtaining notifications. The notification module 124 of the web service 104, for instance, may process notifications received from other web services and manage the notifications from various sources for distribution to the computing device 102 over the network 106. The notification system 118 may then process the notifications and manage how the notifications are displayed as part of the representations without executing the applications 110. This approach may be used to improve battery life and performance of the computing device 102 by not running each of the applications 110 to output the notifications.

The background manager 120 represents functionality to enable and control background tasks for applications 110. Generally speaking, the operating system 108 may prevent applications from running while in the background so that memory and processing resources are preserved for use by an application running in the foreground. Thus, when an application is not in the foreground, execution for the application is suspended and the application may be unable to run code. However, the operating system 108 may allow applications to define background tasks that are coordinated by the background manager 120. The background manager 120 may be configured to provide a controlled resource-managed environment that provides a mechanism for performance of some designated tasks in the background. The background manager 120 coordinates execution of the background tasks including registering applications for background tasks, firing triggers to launch the tasks, providing a host for running the tasks, controlling resource allocation for the tasks, and so forth. Upon firing of an appropriate trigger by the background manager 120, an entry point of an application registered for the particular task is launched to perform the task. The controlled resource-managed environment may allocate a limited amount of resources (time, CPU, etc.) to each background task and place other restrictions upon the kinds of resources that can be accessed and operations that can be performed. In other words, the background tasks may be "sandboxed" to enhance performance, security, and/or battery life.

As mentioned, ordinarily registration of an application with the notification system and/or background manager occurs after a user interacts with an application such as in response to explicit user interaction to select and launch the application. Thus, traditionally a particular application that is pre-installed may not be fully activated for background tasks and/or notifications until after a user chooses to launch the particular application. Without activation described herein, tiles 114 for applications may appear "dead" in the user interface 112 initially presented to a user rather than being "alive" with various live content 116.

In accordance with techniques described herein, the activation module 122 represents functionality operable to activate notifications for applications via the notification system 118 and/or background manager 120. In at least some embodiments, the activation module 122 is implemented as part of a set-up or log-in sequence that runs when a user accesses a device and/or operating system 108 for the first time. For instance, the activation module 122 may be employed to facilitate activation of applications during first-time configuration of user accounts for the operating system 108. The activation may therefore occur before the user is able to interact with the operating system and/or applications of the device.

In particular the activation module 122 is configured to process set-up settings 126 for pre-installed applications provided by OEMs to specify arrangement of tiles 114 (or other representations) in the user interface 112 and to activate notifications for the installed applications as part of the initial set-up or log-in sequence. Based on the set-up settings 126, the activation module 122 can set-up notifications directly on behalf of applications and/or cause registration of the pre-installed applications with the background manager 120. Registration with the background manager provides an opportunity during the initial set-up or log-in sequence for application code to run as background tasks. An appropriate trigger is fired via the background manager 120 to one or more pre-installed applications and the background manager 120 may then allocate time for background tasks associated with each application. OEMs and application developers may configure their applications to take advantage of the allocated time by registering for notifications with the notification system 118. Accordingly, the activation module 122 provides a mechanism by which notifications for applications 110 may be activated during initial log-in of a user, such that live content 116 may be obtained and incorporated with tiles 114 or other representations for applications for the first interaction of the user with the operating system 108. This can occur by operation of the activation module 122 to directly register applications for notifications and/or by setting up and using background tasks to register for the notifications.

The set-up settings 126 for pre-installed applications may be implemented in various ways. In one approach, set-up settings 126 for multiple applications may be contained in a common file provided by the operating system 108. OEMs may edit the common file to include particular settings for individual applications. In another approach, OEMs may provide individual settings files for each application as part of install packages or otherwise. The operating system 108 may rely on the individual settings files and/or process the files during application installation to extract settings and/or incorporate settings for different applications in a common file, database, library, or other designated location for set-up settings 126. The activation module 122 may be configured to access the set-up settings 126 from a designated location during the log-in sequence.

The set-up settings 126 may be configured using files written in a markup language, such as extensible markup language (XML), text files, and/or other suitable techniques typically used to create settings files for applications and devices. The set-up settings 126 can be used to specify various tile attributes including for example size, shape, and pinning/positioning of tiles 114 within either or both of a lock screen (e.g., a screen that appears when a device enters a lock and/or power save state) and/or a start screen (e.g., an initial screen appearing upon device start-up). The set-up settings 126 may also be used to selectively activate notifications for tiles 114 by specifying settings for registering a corresponding application with the notification system 118 and/or background manager 120 as described above and in further detail below.

Figure 2:
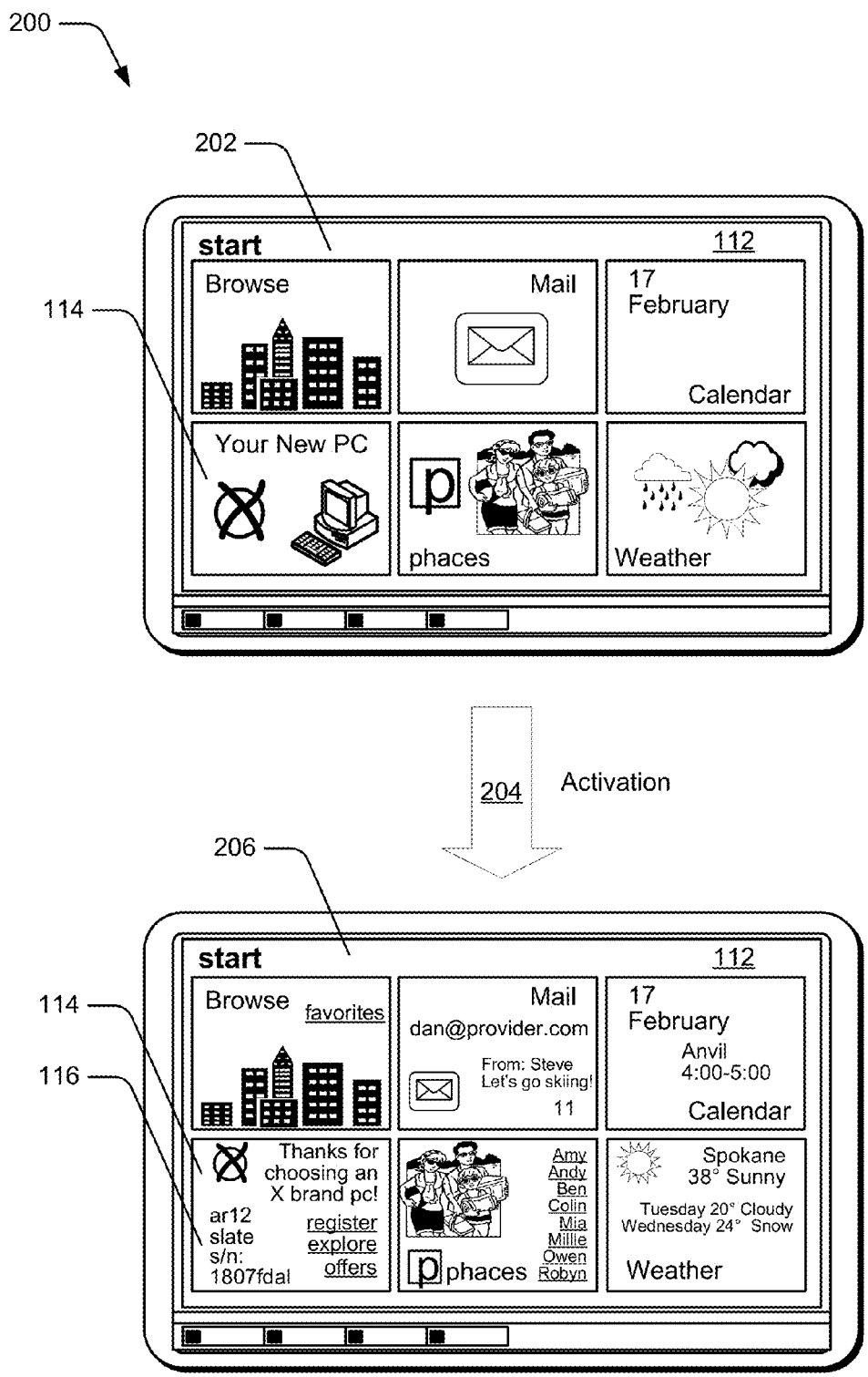
FIG. 2 is a diagram depicting an example of activating live content for a start screen in accordance with one or more embodiments.

To further illustrate, consider now some example user interfaces that are depicted in FIG. 2. In particular, FIG. 2 depicts generally at 200 a diagram showing an example of activating live content for a start screen of an operating system in accordance with one or more embodiments. For instance, at the top of FIG. 2 an example start screen 202 for the user interface 112 of an operating system 108 is depicted as having various representations for applications 110. The representations in this example are configured as tiles 114 that may correspond to respective applications 110. Naturally, comparable techniques may also be applied to other kinds of representations such as icons and/or textual descriptions. Applications may include applications packaged with the operating system 108, applications developed by a provider of the operating system 108, and/or third-party applications from OEMs and other developers. The example applications include a browser, an e-mail client, and a personal information management (PIM) application appearing in the first row of tiles. For the purpose of this document, the first row applications represent applications developed by a provider of the operating system 108. The example applications also include an OEM device management application, a social networking application, and a weather application appearing in the second row of tiles. Here, the second row applications represent third-party applications from OEMs and other developers.

Tiles 114 may be arranged in accordance with set-up settings 126 as described above. OEMs may use set-up settings 126 to indicate positions, sizes, shapes, and other attributes for the tiles 114. In some embodiments, some locations may be reserved for particular operating system 108 and/or provider applications. Thus, positions for other applications may be specified relative to any reserved positions and/or relative to one another. A start screen may be arranged to show different selected applications and corresponding tiles may be arranged in various ways, of which the depicted arrangement is provided as but one non-limiting example. As mentioned, comparable techniques may be employed to configure a lock screen and/or other screens having representations of applications.

The start screen 202 represents tiles as they may appear prior to activation of the tiles for notifications and corresponding live content 116. In this state, the tiles 114 may have default text, logos, and/or graphics to represent corresponding applications. The representations may be static representations (similar to application icons) that do not change over time. Additionally, prior to activation the tiles do not contain any live content 116 and in other words are "dead" tiles.

The arrow 204 represents activation of various applications for notifications in accordance with techniques described herein. In particular, the activation can occur in the course of an initial user log-in and without the user having to select each application individually after the log-in is complete and the start screen appears. Once activation has occurred, the dead tiles depicted in the start screen 202 become "live" tiles that are configured to obtain, use, and display various corresponding live content 116. The example start screen 206 depicted at the bottom of FIG. 2 represents tiles 114 as they may appear after activation of the tiles for notifications and corresponding live content 116.

Various kinds of notifications and live content 116 are contemplated some examples of which are represented by the tiles appearing in the start screen 206. For instance, live content 116 may include data roamed with a user account such as a favorites list, a contact list, recently used documents, and so forth. Accordingly, the browser tile in start screen 206 depicts a link to favorites and the social networking tile depicts a list of friends. Application data such as alerts, messages, document or message previews, appointments and/or calendar reminders, may also be obtained and used as live content 116. Examples include the message preview and message count associated with the e-mail tile, appointment information displayed with the calendar tile, and weather information shown on the weather tile. OEMs may provide user and device specific data/offers as well, as represented by the device model, serial number, and options for registration, device exploration, and offers shown with the tile for the OEM device management application. A variety of other examples are also contemplated.

Thus, activating notifications on first set-up and/or log-in enables a variety of live content 116 to be displayed with application representations in a user interface 112. A screen such as the start screen 206 that include live tiles may be presented for the user's first interaction with the device/operating system rather than showing "dead" tiles as in the start screen 202 and making the user select each application before tiles become active. In this manner, the user is are able to fully experience the features related to live content and OEMs are able to attract user to their applications upon first log-in.

Having considered an example environment and interfaces, consider now some example procedures for pre-installed application activation in accordance with one or more embodiments.

Example Procedures

The following discussion describes notification techniques that may be implemented utilizing the previously described systems and devices. Aspects of each of the procedures may be implemented in hardware, firmware, or software, or a combination thereof The procedures are shown as a set of blocks that specify operations performed by one or more devices and are not necessarily limited to the orders shown for performing the operations by the respective blocks. In portions of the following discussion, reference will be made to the example environment and interfaces discussed above.

Figure 3:
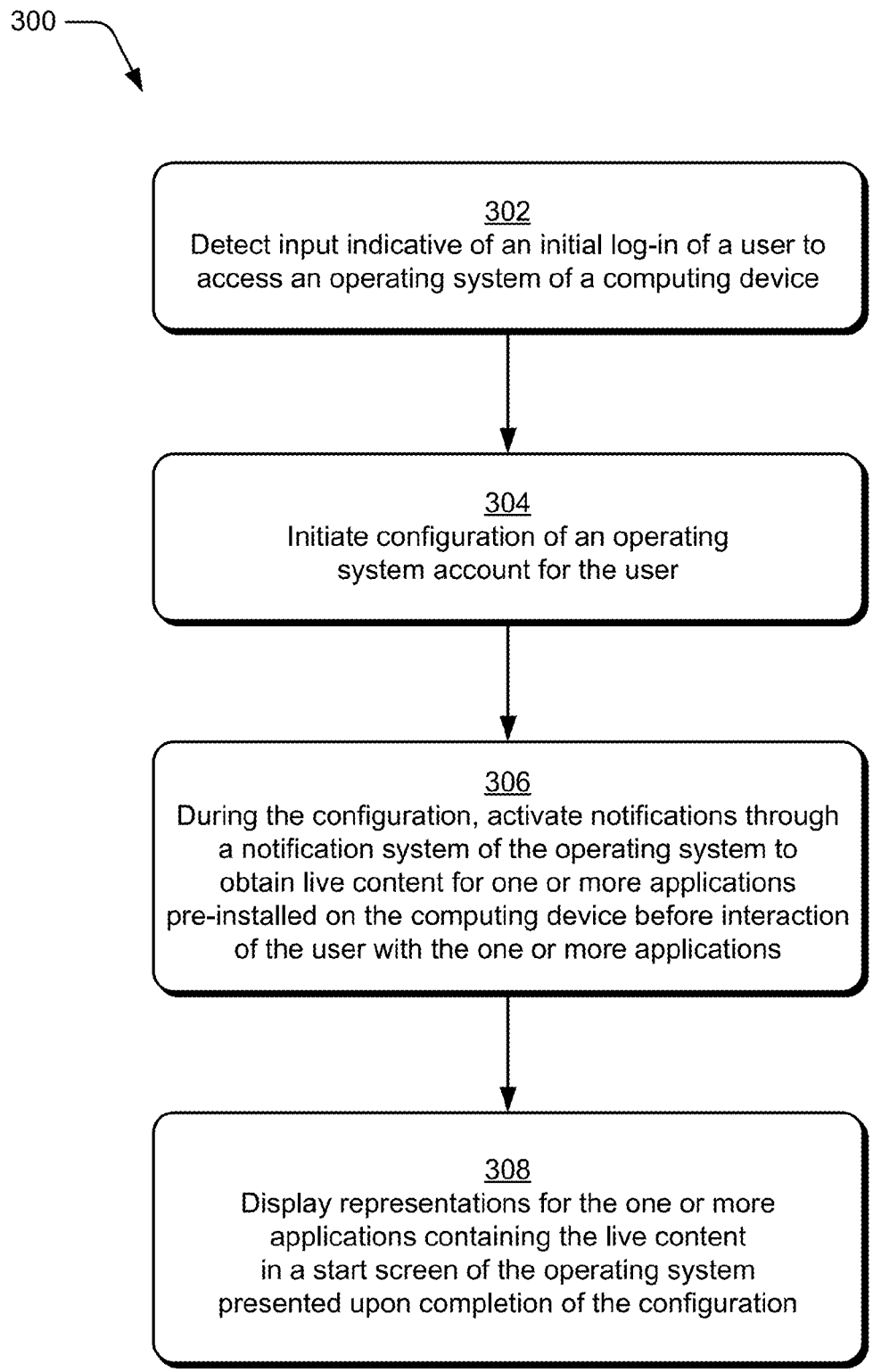

FIG. 3 depicts a procedure 300 in an example implementation in which live content for applications is activated during an initial user log-in. Input is detected that is indicative of an initial log-in of a user to access an operating system of a computing device (block 302). In response, configuration of an operating system account for the user is initiated (block 304). For example, a user may input selections to create an account with the operating system 108. This may occur as part of installing the operating system on a computing device 102 and/or as part of creating multiple accounts for different users of the computing device. The activation module 122 or other functionality of the operating system 108 may detect the selections and initiate a set-up and/or log-in sequence to configure an account for the user. This may involve creating per-user settings, permissions, directories, storage allocation, customizations, and application installs associated with the account. Thus, different user accounts may separate data and settings for different user-identities and enable multiple users of a computing device to customize aspects of the operating system 108 for individual purposes.

During the configuration, notifications are activated through a notification system of the operating system to obtain live content for one or more applications pre-installed on the computing device before interaction of the user with the one or more applications (block 306). For instance, the activation module 122 may be configured to process set-up settings 126 provided for pre-installed applications to enable registration of the pre-installed applications for notifications. Activation may occur in any suitable way. In general, the activation module 122 processes set-up settings 126 that define notification parameters to register applications with the notification system (e.g., direct set-up of notifications) and/or settings for background tasks that can be used to set-up notifications in response to appropriate triggers.

Thus, in one approach the activation module 122 may uses information contained in the set-up settings 126 to register one or more applications for background tasks that occur at some time during the configuration. In the course of the configuration, a trigger for the background tasks may be sent to registered applications, which are then given an allocated amount of time to complete background tasks. Applications developers that choose to do so may configure their applications to use this time to register for notifications from the notification system 118. The corresponding applications are then activated to obtain live content 116, use the content, and/or present live content 116 via tiles 114 and/or other representations as soon as the configuration is complete.

In an alternative approach, set-up settings 126 may provide settings for the notification system 118 that can be used by the activation module 122 to set-up notifications on behalf of applications. Thus, the activation module 122 may operate to parse set-up settings 126 and register one or more applications with the notification system 118 according to notification parameters that are extracted from the set-up settings 126. In this approach, OEMs and developers may use the set-up settings 126 to define notification parameters such as a service for the notifications, an application entry point for the notifications, message and communication formats, conditions, and so forth. The activation module 122 may interact directly with the notification system 118 to set-up and register each application for the notifications. This may occur without using background tasks and/or allocating time to each application as in the first approach discussed above. A variety of other examples are also contemplated.

Representations are displayed for the one or more applications containing the live content in a start screen of the operating system presented upon completion of the configuration (block 308). For instance, once the configuration sequence is complete, a start screen such as the start screen 206 of FIG. 2 may be presented. In the start screen, tiles or other application representations may appear in accordance with pinning, positioning, size, shape, and other attributes specified by set-up settings 126. In addition, applications that have registered for notifications during the configuration may appear with live content 116, such as the examples shown for the start screen 206. The live content 116 is active and appears right away the first time the start screen is presented to the user and does not rely upon user intervention to activate notifications and/or the live content. Live content 116 may also appear right away in a lock screen that appears in a lock mode/power save mode of the computing device 102 and/or other screens having representations of pre-installed applications that are activated in the described manner.

Figure 4:
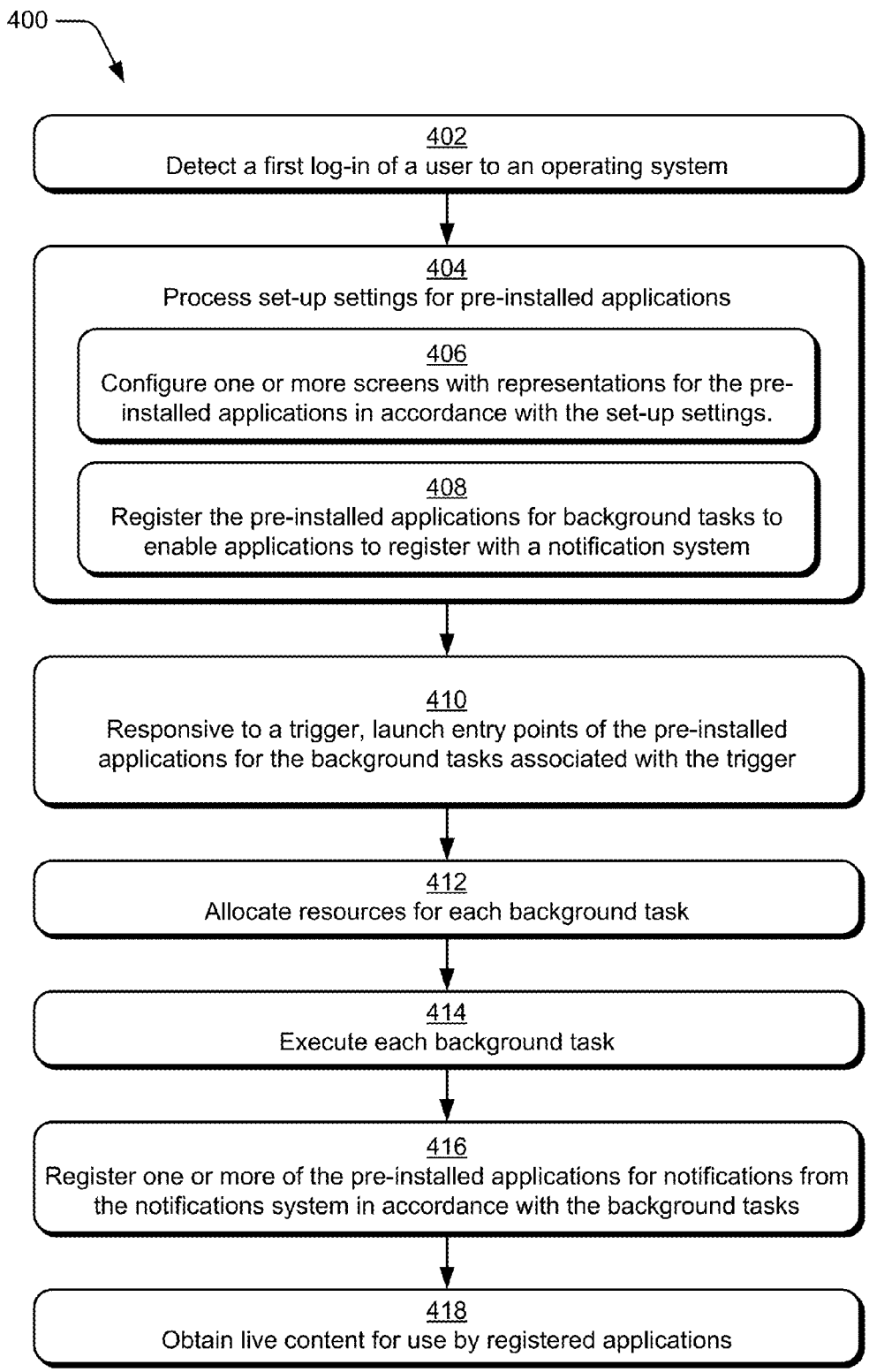
FIG. 4 is a flow diagram depicting a procedure in an example implementation in which set-up settings are processed for activation of a pre-installed application.

FIG. 4 is a flow diagram depicting a procedure 400 in an example implementation in which set-up settings are processed for activation of pre-installed applications. In particular, procedure 400 includes details of example operations that may occur in a scenario in which background tasks are employed to register pre-installed applications for notifications from a notification system 118.

A first log-in of a user to an operating system is detected (block 402). A user may log-in by making selections to create an account and providing information such as preferences, a username, user credentials, and so forth. A set-up or log-in sequence may be implemented by an operating system 108 to handle creation of the account for the user in response to detecting the user selections to establish an account and/or log-in for the first time.

Set-up settings are processed for pre-installed applications (block 404). The processing occurs during the set-up/log-in sequence and without user interaction. For example, an activation module 122 may be configured to process an XML file or other suitable settings file having set-up settings 126 for unattended account configuration. Such a file may also be referred to as an unattend file. The processing may include configuring one or more screens with representations for the pre-installed applications in accordance with the set-up settings (block 406) and registering the pre-installed applications for background tasks to enable applications to register with a notification system (block 408). To do so, the activation module 122 may parse the settings file to obtain set-up settings 126 for different applications and configure tiles in a start screen, lock screen, and/or other screens according to pinning, positioning, size, shape and other attributes for tiles defined by the set-up settings 126. The activation module 122 may also obtain entry points, conditions, triggering events and/or other settings for background tasks from the set-up settings 126 and use this information to register applications with a background manager 120. The background manager 120 may fire triggers in response to appropriate events to invoke entry points and launch code for corresponding tasks.

Accordingly, responsive to a trigger, entry points of the pre-installed applications for the background tasks associated with the trigger are launched (block 410), resources are allocated to each background task (block 412) and each background task is executed (block 414). Thereafter, one or more of the pre-installed applications are registered for notifications from the notification system in accordance with the background tasks (block 416).

For instance, registration of applications with the background manager 120 may associate entry points into application code with a particular triggering events. In this case, the trigger provides time for applications to register with a notification system 118. A single trigger may be associated with multiple entry points and may be fired during the set-up/log-in sequence. This may occur before a start screen that is configured in block 406 is presented to a user. Code for each background task is executed and at least some of the pre-installed applications may interact with the notification system 118 to register for notifications.

In another approach, a start screen that is configured in block 406 is output for presentation to a user and a trigger to provide pre-installed applications time for background tasks is fired at or near the same time. Each application may then register for notifications during their allotted time and updating of the start screen with live content 116 based on the registrations may occur very quickly, such that little or no delay is perceptible by the user. Here, a screen such as start screen 202 of FIG. 2 may be briefly presented and then a transition may rapidly occur to a screen containing live content 116, such as start screen 206, as applications register for notifications and corresponding live content 116 is obtained by the notification system 118.

Live content is obtained for use by registered applications (block 418). As mentioned, the notification system 118 may operate to obtain various notifications on behalf of applications 110 that register with the notification system. The notification system 118 manages notifications including notifications for alerts, messages, updates, and/or other live content 116 that may be displayed as part of the representations of the applications. The notification system 118 may then provide notifications to corresponding applications 110 and/or cause live content 116 to be presented, such as by updating tiles 114 in a start screen with live content 116.

Having considered example procedures for pre-installed application activation, consider now a discussion of an example system and components that can be employed to implement embodiments of the techniques described herein.

Example System

Figure 5:
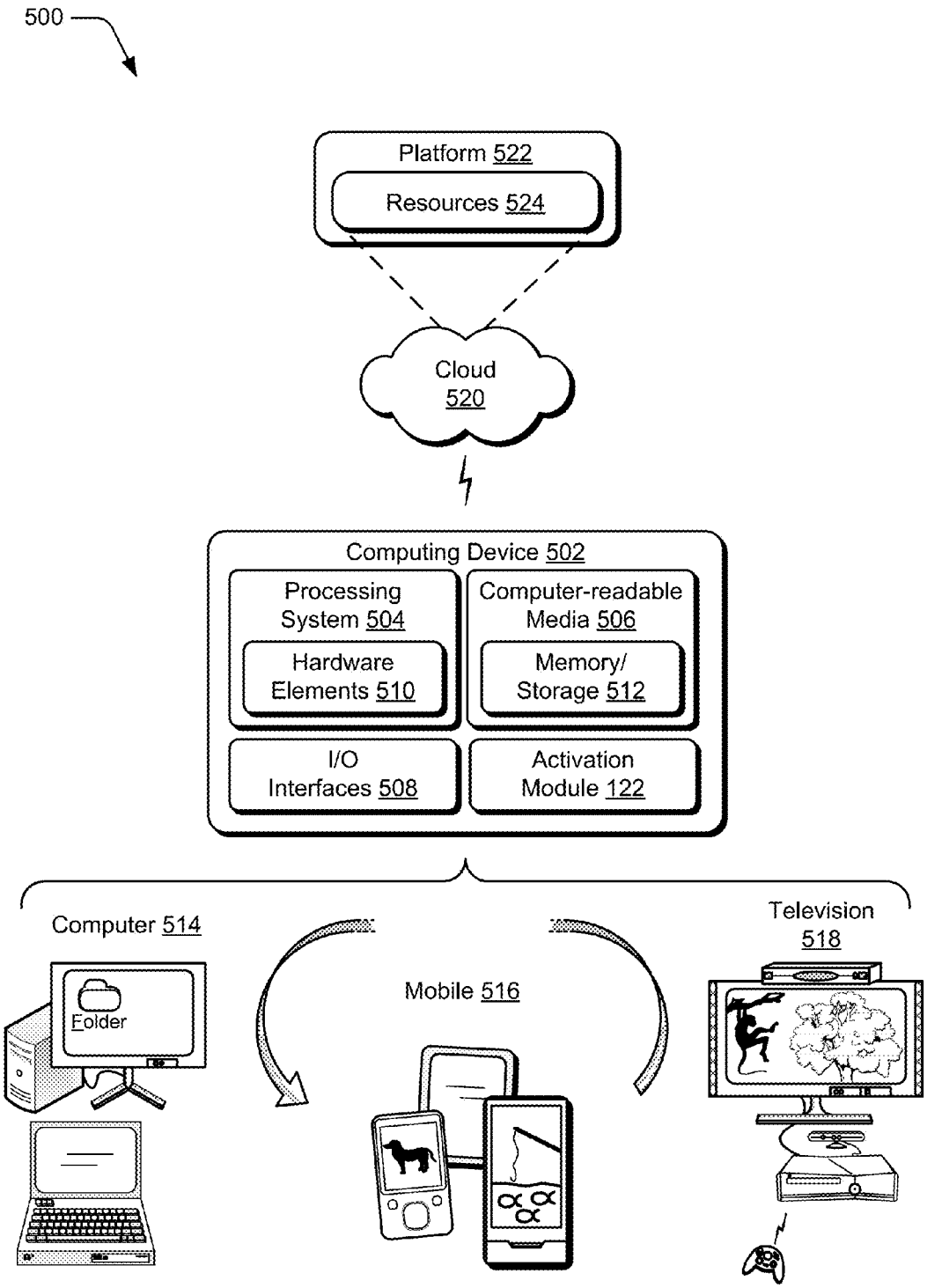
FIG. 5 illustrates an example system and components of the system that can be employed to implement embodiments of the techniques described herein.

FIG. 5 illustrates an example system 500 that includes an example computing device 502 that is representative of one or more computing systems and/or devices that may implement the various techniques described herein. The computing device 502 may be, for example, a server of a service provider, a device associated with the client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 108, applications 110, notification system 118, background manager 120, activation module 122 and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the activation module 122 on the computing device 502. The functionality of the activation module 122 and other modules may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   detecting input indicative of an initial log-in of a user to access an operating system of the computing device;
   initiating configuration of an operating system account for the user;
   during the configuration, activating notifications through a notification system of the operating system for one or more applications pre-installed on the computing device;
   receiving the notifications through execution of background tasks by associating entry points of the pre-installed applications with a trigger for the background tasks; and
   firing the trigger to invoke the entry points and cause execution of the background tasks.

2. A method as described in claim 1, wherein the activating of the notifications during the configuration occurs without interaction of the user with the one or more pre-installed applications.

3. A method as described in claim 1, wherein at least some of the notifications are to provide live content for use by the pre-installed applications.

4. A method as described in claim 1, wherein the notification system is configured to handle notifications on behalf of applications of the computing device without executing the applications.

5. A method as described in claim 1, wherein the activating comprises parsing set-up settings provided for the one or more pre-installed applications to extract notification parameters used to set-up the notifications through direct interaction with the notification system.

6. A method as described in claim 1, wherein the activating comprises:
   registering the one or more pre-installed applications with a background manager of the operating system to enable the background tasks for the pre-installed applications to provide an opportunity for the pre-installed applications to register with the notification system using the background tasks.

7. A method as described in claim 6, wherein the activating further comprises:
   firing the trigger associated with the background tasks;
   allocating system resources to the background tasks for each of the pre-installed applications; and
   executing the background tasks to register at least some of the pre-installed applications with the notification system.

8. A method as described in claim 1, wherein at least one of the pre-installed applications is a third-party application associated with an original equipment manufacturer (OEM) of the computing device that pre-installs the third-party application.

9. A method as described in claim 1, further comprising:
   obtaining notifications for the one or more pre-installed applications via the notification system;
   configuring representations of the pre-installed applications in a start screen for the operating system to contain live content from the obtained notifications; and
   displaying the start screen having the representations containing the live content upon completion of the configuration of the operating system account.

10. A method as described in claim 9, wherein the representations comprise tiles.

11. One or more computer-readable storage media storing instructions that, when executed by a computing device, cause the computing device to perform operations comprising:
   detecting a first log-in of a user to an operating system of the computing device;
   processing set-up settings associated with pre-installed applications of the computing device to register the pre-installed applications with a notification system for notifications including live content for display with representations of the pre-installed applications in one or more screens of a user interface for the operating system including associating entry points of the pre-installed application with a trigger for the notifications; and before interaction of the user with the pre-installed applications, obtaining notifications via the notification system responsive to firing of the triggers associated with the entry points for at least some of the pre-installed applications, the notifications including live content for display with the representations of the pre-installed applications in a start screen of the operating system.

12. One or more computer-readable storage media as described in claim 11, wherein processing the set-up settings comprises parsing a markup language file edited by an original equipment manufacturer (OEM) of the device to include settings for one or more of the pre-installed applications pre-installed by the OEM.

13. One or more computer-readable storage media as described in claim 11, wherein processing the set-up settings comprises extracting settings to register the pre-installed applications to execute background tasks that enable the pre-installed applications to register individually with the notification system for notifications in response to firing of a trigger associated with the background tasks.

14. One or more computer-readable storage media as described in claim 11, wherein processing the set-up settings comprises extracting notification parameters for the pre-installed applications to register the pre-installed applications through direct interaction with the notification system.

15. One or more computer-readable storage media as described in claim 11, wherein the instructions, when executed by the computing device, further cause the computing device to perform operations comprising:

configuring the one or more screens including the start screen to include the representations of the pre-installed applications in accordance with the set-up settings; and displaying the start screen with the representations including the live content obtained via the notification system.

16. One or more computer-readable storage media as described in claim 15, wherein the representations comprise one or more of tiles, icons, or textual representations.

17. One or more computer-readable storage media as described in claim 11, wherein the processing and obtaining are performed without executing the pre-installed applications.

18. A computing device comprising:

a processing system;

one or more modules operable at least in part via hardware of the processing system to implement an operating system configured to:

set-up an operating system account for a user responsive to detection of an initial log-in of the user to access the operating system;

during set-up of the operating system account and before the user is able to interact with the operating system, activate notifications through a notification system of the computing device for one or more applications pre-installed on the computing device by:

allocating resources to the pre-installed applications to run background tasks during the set-up; and registering the one or more pre-installed applications with the notification system to receive notifications through execution of the background tasks by associating entry points of the pre-installed application with a trigger for the background tasks; and firing the trigger to invoke the entry points and cause execution of the background tasks.

19. The computing device of claim 18, wherein the notifications comprises live content for incorporation in representations of the pre-installed applications within one or more screens of a user interface for the operating system.

20. The computing device of claim 18, wherein allocating the resources comprises:

parsing an extensible markup language (XML) file to obtain settings for registration of the pre-installed applications with a background manager of the operating system to run background tasks; and wherein the registering the pre-installed applications with the background manager is based at least in part on the settings.

* * * * *